Aug. 27, 1935.  J. W. LEIGHTON  2,012,883

END CONNECTION FOR VEHICLE SPRINGS

Filed June 7, 1933

Inventor.
John Wycliffe Leighton

Patented Aug. 27, 1935

2,012,883

UNITED STATES PATENT OFFICE 2,012,883

END CONNECTION FOR VEHICLE SPRINGS

John Wycliffe Leighton, Port Huron, Mich.

Application June 7, 1933, Serial No. 674,606

2 Claims. (Cl. 267—54)

The principal object of this invention is to provide an end connection with a threaded bearing for either the spring end or frame bracket which will greatly facilitate the assembling of the parts and will obviate many of the difficulties encountered through the distortion of the alignment of the threaded parts.

The principal feature of the invention consists in supporting the threaded bearing bolts at one end in a threaded orifice in a frame bracket or shackle arm and providing a plain bearing at the opposite end thereof.

Figure 1:
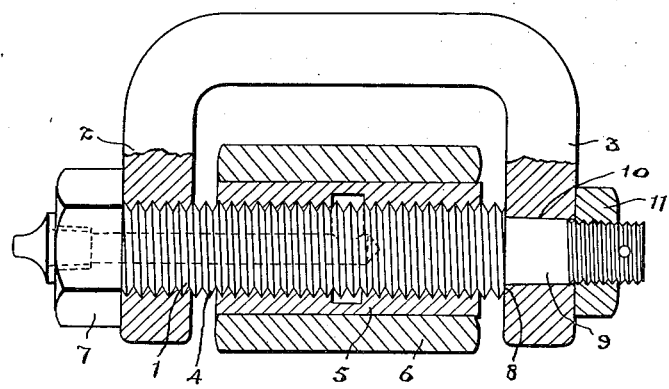

In the accompanying drawing Figure 1 is a sectional elevational view of a threaded pivot bearing constructed in accordance with this invention.

Figure 2:
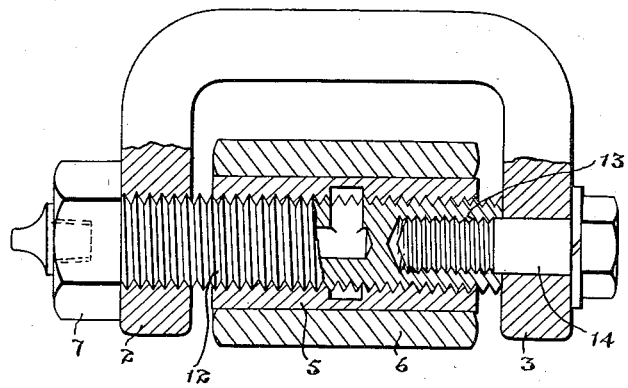

Figure 2 is a sectional elevational view of a modified structure of pivot bearing.

It has been very effectively demonstrated that threaded pivot bearings for spring suspensions in motor vehicles are highly desirable and various forms of such are now in practical use.

In the present invention the pivot bolt 1 which is secured between the arms 2 and 3 of a frame bracket or between a pair of shackle arms, is threaded for the major part of its length with a thread surface 4, a portion of which forms the bearing for the threaded bushing 5 inserted in the spring eye 6.

The end of the threaded portion of said pivot bolt is threaded into the correspondingly threaded orifice in the bracket arm or shackle bar 2 and it may be secured by a lock nut 7 or may be provided with a head to abut the outer side of the arm, or as shown in my previous Patent 1,881,233, the portion of the bolt fitting in the arm may be provided with a thread of a slightly larger diameter than the bearing portion to jam in the arm.

The other end of the bolt 1 is formed with a shoulder 8 to abut the inner face of the other bracket arm or shackle bar and a reduced end 9 which may be tapered if desired, extends through an unthreaded hole 10 in the arm, the outer extremity being threaded to receive a locking nut 11 which binds against the outer side of the arm.

In the form illustrated in Figure 2 the threaded pivot bolt 12 is similar to that shown in Figure 1 with the exception that one end is cut square at the end of the thread to abut the inner face of one of the bracket arms or shackle bars and is provided with a threaded hole 13 to receive a bolt or cap screw 14 which extends through the plain unthreaded orifice in the adjacent arm.

In either construction, in the event of the unthreaded arm being out of alignment with the threaded arm, the threaded pivot bolt may be inserted in the threaded arm and the other may then be drawn into alignment to receive the unthreaded extension with much less difficulty than when both arms are threaded and the thread of the pivot bolt is required to engage accurately.

What I claim as my invention is:

1. An improved spring eye bearing of the rigid bracket type having rigid spaced arms and a threaded bearing member engaging the spring eye in threaded bearing contact and adapted to be mounted at the respective ends in the respective rigid arms of said bracket, characterized in that one only of said rigid bracket arms is threadedly interlocked with said bearing member in combination with a tapered orifice in the other rigid bracket arm receiving a correspondingly tapered end portion of said threaded bearing member in positioning pressure contact, whereby to facilitate initial threaded assembly of said threaded bearing member, bracket and spring eye.

2. An improved spring eye bearing of the rigid bracket type having rigid spaced arms and a threaded bearing member engaging the spring eye in threaded bearing contact and adapted to be mounted at the respective ends in the respective rigid arms of said bracket, characterized in that one only of said rigid bracket arms is threadedly interlocked with said bearing member in combination with a tapered orifice in the other rigid bracket arm receiving a correspondingly tapered end portion of said threaded bearing member in positioning pressure contact, whereby to facilitate initial threaded assembly of said threaded bearing member, bracket and spring eye, said threaded bearing member having a stop shoulder at the inward side of its tapered end portion to engage the inward side of the second-mentioned bracket arm, the outer end of the tapered end portion terminating in a threaded extension, and a nut threaded on said extension and drawing the stop shoulder and tapered surface of the threaded bearing member into pressure and positioning contact respectively with the adjacent respective surfaces of the second-mentioned rigid bracket arm.

JOHN WYCLIFFE LEIGHTON.